(12) United States Patent
Nukui et al.

(10) Patent No.: US 10,900,146 B2
(45) Date of Patent: Jan. 26, 2021

(54) GLASS-FIBER-YARN CONNECTED BODY

(71) Applicant: NITTO BOSEKI CO., LTD., Fukushima (JP)

(72) Inventors: Yosuke Nukui, Fukushima (JP); Hiroyasu Aihara, Fukushima (JP); Yoshinari Kasai, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 16/474,592

(22) PCT Filed: Dec. 11, 2017

(86) PCT No.: PCT/JP2017/044437
§ 371 (c)(1),
(2) Date: Jun. 28, 2019

(87) PCT Pub. No.: WO2019/116432
PCT Pub. Date: Jun. 20, 2019

(65) Prior Publication Data
US 2020/0123682 A1 Apr. 23, 2020

(51) Int. Cl.
*D02G 3/40* (2006.01)
*D02G 3/18* (2006.01)
(Continued)

(52) U.S. Cl.
CPC .............. *D02G 3/40* (2013.01); *C03B 37/10* (2013.01); *C03C 27/10* (2013.01); *D02G 3/18* (2013.01);
(Continued)

(58) Field of Classification Search
None
See application file for complete search history.

(56) References Cited

U.S. PATENT DOCUMENTS 3,672,148 A 6/1972 Benson et al.
8,505,271 B2 8/2013 Bowland et al.
(Continued)

FOREIGN PATENT DOCUMENTS

EP 1 712 506 A1 10/2006
FR 2090750 * 1/1972
(Continued)

OTHER PUBLICATIONS

Machine translation of FR2090750, Benson et al. (Year: 1972).*
Office Action dated Jan. 15, 2020 issued in the corresponding Chinese patent application No. 201780089310.7.

*Primary Examiner* — Shawn Mckinnon
(74) *Attorney, Agent, or Firm* — Carrier Blackman & Associates, P.C.; William D. Blackman; Joseph P. Carrier

(57) ABSTRACT

The glass-fiber-yarn joined body 1 is provided with glass fiber yarns 2, 3, and a connection 5 in which a resin yarn 4 is wound around ends of both of the glass fiber yarns 2, 3, the ends being superimposed with each other. The connection 5 has a width $W_1$ of 20 to 40 mm. When a connection diameter R as a total of diameters of the respective glass fiber yarns 2, 3 and the thickness of the resin yarn 4 wound around the connection 5 is 500 to 5000 μm and a mass of each of the glass fiber yarns 2, 3 is 200 to 6000 tex, a value of a ratio of mass of each of the glass fiber yarns 2, 3 relative to the connection diameter R is in the range of 0.32 to 2.00.

6 Claims, 1 Drawing Sheet

(51) Int. Cl.
   *D02G 3/44*    (2006.01)
   *C03C 27/10*   (2006.01)
   *C03B 37/10*   (2006.01)

(52) U.S. Cl.
   CPC ......... *D02G 3/447* (2013.01); *D10B 2101/06* (2013.01); *D10B 2505/02* (2013.01)

(56) References Cited

U.S. PATENT DOCUMENTS

2008/0318020  A1   12/2008   Barnaud
2013/0330553  A1   12/2013   Johnson et al.

FOREIGN PATENT DOCUMENTS

| FR | 2090750 A5    | 1/1972  |
| JP | S46-006471 A  | 12/1971 |
| JP | H06-040668 A  | 2/1994  |
| JP | H06-316378 A  | 11/1994 |
| JP | 2007-069985 A | 3/2007  |
| JP | 2008-529945 A | 8/2008  |
| JP | 2012-161960 A | 8/2012  |
| JP | 2013-500914 A | 1/2013  |

* cited by examiner

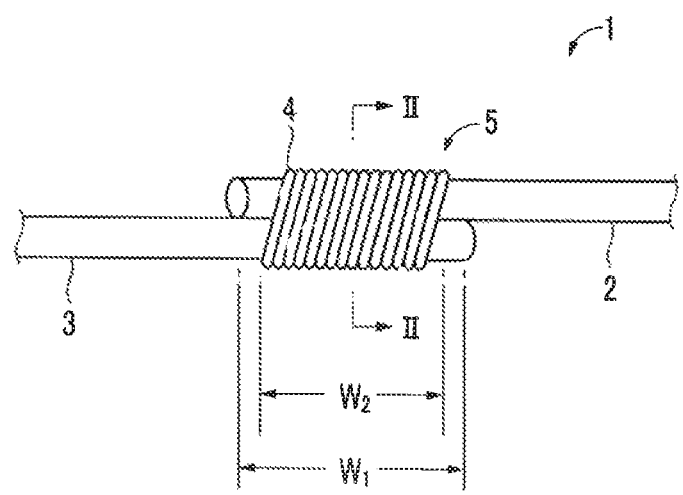
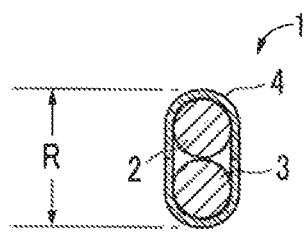

GLASS-FIBER-YARN CONNECTED BODY

TECHNICAL FIELD

The present invention relates to a glass-fiber-yarn joined body.

BACKGROUND ART

There has been known long-fiber-reinforced plastic formed by using a thermosetting resin or a thermoplastic resin as a matrix resin and providing in the matrix resin glass fiber yarns (glass strands) with a large fiber length as a reinforcement. The long-fiber-reinforced plastic is, for example, produced by impregnating resin into a glass fiber yarn pulled out from a glass roving by application of predetermined tension, allowing passage of the glass fiber yarn through a dice to remove excess resin and adjust an amount of adhering resin, and then curing the resin.

Here, the glass fiber yarn is a bundle of a plurality of glass filaments with the surfaces thereof applied with a binder, and the glass roving is formed by winding the glass fiber yarn around a core in a rolled state.

In the manufacturing of the long-fiber-reinforced plastic, the constant supply of the glass fiber yarn is desired for efficient manufacturing. Meanwhile, the glass roving is produced and transported in the state of being wound around the roll in the rolled state, and winding the glass fiber yarn with an excessively large length around one roll is disadvantageous in manufacturing and transportation.

Therefore, a long glass fiber yarn has been obtained by joining the terminal end of a glass fiber yarn pulled out from one glass roving and the starting end of a glass fiber yarn pulled out from another glass roving to form a glass-fiber-yarn joined body.

As a method for joining the glass fiber yarns, for example, a method called air-splicing is known, where the terminal end of a first glass fiber yarn and the starting end of a second glass fiber yarn are jetted with air, to be unwound and intertwisted so as to be joined (cf. Patent Literature 1). Further, as the method for joining the glass fiber yarns, a method is known, where the terminal end of the first glass fiber yarn and the starting end of the second glass fiber yarn are joined by a knotting method called a creel (cf. Patent Literature 2).

CITATION LIST

Patent Literature

Patent Literature 1: Japanese Patent Laid-Open No. 2012-161960
Patent Literature 2: Japanese Patent Laid-Open No. 2007-69985

SUMMARY OF INVENTION

Technical Problem

However, in the case of the air-splicing, since the terminal end of a first glass fiber yarn and the starting end of a second glass fiber yarn are merely intertwisted, there is a disadvantage that the disjoining may occur when the yarn is pulled out from the roving by application of tension. Meanwhile, in the case of the creel, since a knot is formed, there is a disadvantage that after the impregnation of the resin into the glass fiber yarn, trouble may occur at the time of the passage through the dice.

Moreover, as the method for joining the glass fiber yarns, a method called splicing is known, where the terminal end of the first glass fiber yarn and the starting end of the second glass fiber yarn are superimposed, and a resin yarn is wound around a portion where both glass fiber yarns are superimposed so that both yarns are joined. However, in the splicing as well, depending on the joined state, there are disadvantages that the disjoining may occur when the glass fiber yarn is pulled out from the roving by application of tension, trouble may occur at the time of the passage through the dice, and furthermore, the opening degree of the joined portion may decrease to prevent sufficient appearance quality from being obtained in a molded product.

An object of the present invention is to provide a glass-fiber-yarn joined body which solves the disadvantages as thus described, is not disjoined when applied with tension, can be allowed to pass through a dice without trouble after impregnation of resin, and makes it possible to obtain excellent appearance quality in a molded product.

Solution to Problem

As a result of conducting intensive studies on the splicing, the present inventors have found that the above problems can be solved by adjusting a condition at the time of superimposing the terminal end of the first glass fiber yarn and the starting end of the second glass fiber yarn and a condition at the time of winding the resin yarn, to achieve the present invention.

The glass-fiber-yarn joined body of the present invention is a glass-fiber-yarn joined body provided with: a first glass fiber yarn; a second glass fiber yarn; and a connection in which a resin yarn is wound around ends of both of the glass fiber yarns, the ends being superimposed with each other. The connection has a width in a range from 20 to 40 mm, and when a connection diameter as a total of diameters of the respective glass fiber yarns and a thickness of the resin yarn wound around the connection is in a range of 500 to 5000 μm and a mass of each of the glass fiber yarns is in a range of 200 to 6000 tex (g/km), a value of a ratio of mass of the glass fiber yarn relative to the connection diameter (mass of glass fiber yarn (unit: tex)/connection diameter (unit: μm) is in a range of 0.32 to 2.00.

The glass-fiber-yarn joined body of the present invention is provided with the connection formed by winding the resin yarn around a portion where the end of the first glass fiber yarn and the end of the second glass fiber yarn are superimposed, and by the connection having the width in the range from 20 to 40 mm, no disjoining occurs upon application of tension and the passage through the dice is possible without trouble after impregnation of resin.

When the width of the connection is smaller than 20 mm in the glass-fiber-yarn joined body of the present invention, the disjoining occurs upon application of tension, and when the width of the connection exceeds 40 mm, trouble occurs at the time of the passage through the dice after the impregnation of the resin.

When the connection diameter as the total of the diameters of the respective glass fiber yarns and the thickness of the resin yarn wound around the connection is in the range of 500 to 5000 μm and the mass of each of the glass fiber yarns is in the range of 200 to 6000 tex, the value of the ratio of mass of the glass fiber yarn relative to the connection diameter (mass of glass fiber yarn/connection diameter) is in the range of 0.32 to 2.00, so that the glass-fiber-yarn joined body of the present invention can be allowed to pass through the dice without trouble after the impregnation of the resin and makes it possible to obtain excellent appearance quality.

When the value of the ratio of mass of the glass fiber yarn relative to the connection diameter R exceeds 2.00 in the glass-fiber-yarn joined body of the present invention, the winding strength of the resin yarn becomes large with respect to the thickness of the resin yarn, thus making it difficult to making it difficult that expansion of gap among glass filaments occur at the connection. As a result, the impregnability of the resin into the connection decreases, and when a molded body is formed, enough appearance quality cannot be obtained.

When the value of the ratio of mass of the glass fiber yarn relative to the connection diameter R is less than 0.32 in the glass-fiber-yarn joined body of the present invention, the amount of resin yarns wound around the connection increases, thus causing trouble at the time of the passage through the dice after the impregnation of the resin. Further, as a result of the increase in the amount of resin yarns wound around the connection, the opening of the connection, which is an expansion of gap among glass filaments at the connection, becomes difficult and the impregnability of the resin into the connection decreases, thus making it impossible to obtain enough appearance quality when a molded body is formed.

In the glass-fiber-yarn joined body of the present invention, the value of the ratio of mass of the glass fiber yarn relative to the connection diameter (mass of glass fiber yarn/connection diameter) is preferably in the range of 0.64 to 1.55 because, in this range, the opening degree of the glass fiber yarn in the connection increases and in particular, the impregnability of the resin into the connection increases.

Therefore, by having the configuration described above, the glass-fiber-yarn joined body of the present invention is not disjoined when applied with tension, can be allowed to pass through the dice without trouble after the impregnation of the resin, and makes it possible to obtain excellent appearance quality in a molded product.

Moreover, in the glass-fiber-yarn joined body of the present invention, a width of a wound part where the resin yarn is wound is preferably in a range of 60 to 110% of a width of the connection. Since the width of the wound part where the resin yarn is wound is in the range of 60 to 110% of the width of the connection, the glass-fiber-yarn joined body of the present invention can reliably prevent the glass fiber yarns from being disjoined upon application of tension.

Furthermore, the glass-fiber-yarn joined body of the present invention can be used for a glass-fiber-reinforced resin molded product that includes the same and makes it possible to obtain a glass-fiber-reinforced resin molded product with excellent appearance quality.

BRIEF DESCRIPTION OF DRAWINGS

FIG. 1 is a perspective view schematically illustrating a configuration of a glass-fiber-yarn joined body of the present invention.

FIG. 2 is a sectional view along a line 11-11 of FIG. 1.

DESCRIPTION OF EMBODIMENTS

Next, an embodiment of the present invention will be described in more detail with reference to the attached drawings.

A glass fiber joined body 1 of the present embodiment illustrated in FIG. 1 is used for the manufacturing of long-fiber-reinforced plastic (glass-fiber-reinforced resin molded product) such as long fiber reinforced thermoplastics (LFT) or a filament winding molded product. The glass fiber joined body 1 includes a first glass fiber yarn 2, a second glass fiber yarn 3, and a connection 5 formed by winding a resin yarn 4 around a portion where the terminal end of the first glass fiber yarn 2 and the starting end of the second glass fiber yarn 3 are superimposed, and the glass fiber yarns 2, 3 are joined by the connection 5.

The glass fiber yarns 2, 3 are obtained by applying a binder onto a glass filament and then bundling a plurality of glass filaments, the glass filaments having been formed by melting a glass batch prepared so as to have a predetermined glass composition when melted (a raw material of glass) and drawing the glass melt from a bushing having a large number of nozzles. The predetermined glass composition includes 50 to 70% by mass of $SiO_2$, 5 to 30% by mass of $Al_2O_3$, 0 to 30% by mass of $B_2O_3$, 0 to 15% by mass of MgO, 0 to 30% by mass of CaO, and 0 to 5% by mass of the other components (e.g., $Li_2O$, $Na_2O$, $K_2O$, $Fe_2O_3$, $TiO_2$, $F_2$) with respect to a total amount of glass fibers.

Here, a glass composition of each of the glass fiber yarns 2, 3 is preferably a composition of E-glass (a glass composition which includes 52 to 56% by mass of $SiO_2$, 12 to 16% by mass of $Al_2O_3$, 20 to 25% by mass of CaO and MgO in total, 5 to 10% by mass of $B_2O_3$, and 0 to 1% by mass of $Li_2O$, $Na_2O$, and $K_2O$ in total with respect to a total amount of the glass fibers), because the glass with this composition is easy to manufacture and excellent in versatility.

The glass filament has a diameter in the range of 5.0 to 25.0 μm, and each of the glass fiber yarns 2, 3 is formed by bundling the glass filaments in the number in the range of 400 to 6000 and has a mass in the range of 200 to 6000 tex (200 to 6000 g per 1000 m). Note that each of the glass fiber yarns 2, 3 is wound around a roll to form a roving, not illustrated.

Here, in view of the magnitude of contribution to the strength of the long-fiber-reinforced plastic and the height of efficiency in the manufacturing of the glass fiber yarn, the diameter of the glass filament is preferably 10.0 to 25.0 μm, more preferably 15.0 to 25.0 μm, still more preferably 16.5 to 24.5 μm, particularly preferably 16.5 to 24.0 μm, and most preferably 16.6 to 23.5 μm.

Further, in the glass fiber yarns 2, 3, in view of the magnitude of contribution to the strength of the long-fiber-reinforced plastic and the height of efficiency in the manufacturing of the glass fiber yarn, 1000 to 5000 glass filaments are preferably bundled, and 1500 to 4500 glass filaments are preferably bundled.

Moreover, in view of the magnitude of contribution to the strength of the long-fiber-reinforced plastic and the height of efficiency in the manufacturing of the glass fiber yarn, the mass of each of glass fiber yarns 2, 3 is preferably 1000 to 5000 tex, and more preferably 1100 to 4500 tex.

For the resin yarn 4, it is preferable to use a yarn made of a thermoplastic resin or a thermosetting resin, such as polyamide, polypropylene, polyethylene, or polyester, is preferably used and when the matrix resin of the long-fiber-reinforced plastic is the thermoplastic resin, a yarn made of polyamide is preferably used.

The connection 5 is a portion where the terminal end of the first glass fiber yarn 2 and the starting end of the second glass fiber yarn 3 are superimposed, and in more detail, the connection 5 is a portion from the terminal edge of the first glass fiber yarn 2 to the starting edge of the second glass fiber yarn 3. The connection 5 has a width $W_1$ which is 20 to 40 mm, preferably 23 to 37 mm, more preferably 25 to 35 mm, and further preferably 27 to 33 mm.

The resin yarn 4 is wound around the connection 5 by using, for example, a splicer (manufactured by Mesdan S.p.A) or the like, and a portion where the resin yarn 4 is wound has a width $W_2$ being 60 to 110% of the width $W_1$ of the connection 5. Here, from the viewpoint of using a smaller amount of resin yarns while more reliably preventing the resin yarns from being disjoined upon application of tension, the portion where the resin yarn 4 is wound has a width $W_2$ preferably in the range of 65 to 100%, more preferably has a width $W_2$ in the range of 70 to 90%, and further preferably has a width $W_2$ in the range of 70 to 80%, with respect to the width $W_1$ of the connection.

The glass fiber joined body 1 has a connection diameter R in the range of 500 to 5000 μm. The connection diameter R is the total of the diameters of the glass fiber yarns 2, 3 and the thickness of the resin yarn 4 in the laminating direction of the glass fiber yarns 2, 3 when the resin yarn 4 is wound around the connection 5. Note that FIG. 2 schematically illustrates the connection diameter R as the total of the diameters of the glass fiber yarns 2, 3 and the thickness of the resin yarn 4 wound around the connection 5.

Here, the connection diameter R is preferably in the range of 1000 to 3700 μm, more preferably in the range of 1200 to 3500 μm, and further preferably in the range of 1300 to 3200 μm.

The glass fiber joined body 1 has a mass in the range of 200 to 6000 tex and the connection diameter R in the range of 500 to 5000 μm, and as a result, the value of the ratio of mass of the glass fiber yarn 2 or the glass fiber yarn 3 relative to the connection diameter R (mass of glass fiber yarn/connection diameter R) is in the range of 0.32 to 2.00, preferably in the range of 0.43 to 1.92, more preferably in the range of 0.65 to 1.55, and further preferably in the range of 0.68 to 1.52.

Note that FIGS. 1 and 2 illustrate a state where the resin yarn 4 is wound around the connection 5 once, but the resin yarn 4 may be wound around the connection 5 twice or more.

In the present embodiment, the case has been described where the terminal end of the first glass fiber yarn 2 and the starting end of the second glass fiber yarn 3 are joined. However, in the glass fiber joined body 1, the starting end of the first glass fiber yarn 2 or the terminal end of the second glass fiber yarn 3 may be joined to another glass fiber yarn or another glass fiber joined body.

Next, examples and comparative examples of the present invention will be illustrated.

EXAMPLES

Example 1

In the present example, first, a glass batch (a raw material of glass), prepared so as to have a composition of E-glass when melted, was melted and pulled out from a bushing provided with a large number of nozzles to form fibers as glass filaments, a binder was applied onto each of the glass filaments, a plurality of glass filaments were then bundled to form the glass fiber yarns 2, 3, and the glass fiber yarns 2, 3 were each wound around a roll to form a roving.

Each of the glass fiber yarns 2, 3 in cross section has 4000 glass filaments bundled, each with a diameter of 17.1 μm, and has a mass of 2400 tex.

Next, the terminal end of the glass fiber yarn 2 and the starting end of the glass fiber yarn 3 were taken out of the rovings and superimposed to form the connection 5 having a width $W_1$ of 30 mm. Next, the resin yarn 4 made of polyamide was wound around the connection 5 by using the splicer (manufactured by Mesdan S.p.A) or the like so that the wound part had a width $W_2$ being 75% of the width $W_1$ of the connection 5 and the connection diameter R was 2000 μm, to form the glass-fiber-yarn joined body 1 where the glass fiber yarns 2, 3 were joined by the connection 5.

As a result, in the glass-fiber-yarn joined body 1 of the present example, the value of the ratio of mass of the glass fiber yarn 2 or the glass fiber yarn 3 relative to the connection diameter R (mass of glass fiber yarn/connection diameter R) is 1.20 (=2400/2000).

Next, while tension was applied to the glass-fiber-yarn joined body 1 of the present example so that its traveling speed was 15 m/min, a thermoplastic resin as a matrix resin was fused and impregnated into the glass-fiber-yarn joined body 1, which was allowed to pass through the dice for removal of excess resin, whereafter the resin was cured by cooling and the obtained glass-fiber-yarn joined body 1 was cut off to manufacture an intermediate molded body (pellet) of long-fiber-reinforced plastic. Then, injection molding was performed using this pellet to manufacture a molded body of the long-fiber-reinforced plastic. For the manufacturing, 48 glass fiber rovings having 47 connections 5 were used, and evaluations were made as to whether or not the disjoining has occurred, the dice traveling ability, and the opening degree of the connection 5.

Concerning whether or not the disjoining has occurred, for the 47 connections 5, the evaluation was made as ○ when no disjoining had occurred during traveling, and the evaluation was made as X when the disjoining has occurred.

Concerning the dice traveling ability, for the 47 connections 5, the evaluation was made as ○ when the connections 5 had been able to travel while not stuck in the dice, and the evaluation was made as X when the connections 5 had been unable to travel due to being stuck in the dice.

Concerning the opening degree of the connection 5, for 47 pellets including the connections 5, at the time of infiltrating ink from the end of the pellet, the evaluation was made as ◉ when no connection 5 had been filtrated with the ink, the evaluation was made as ○ when one or two connections 5 had been filtrated with the ink, and the evaluation was made as X when three or more connections 5 had been filtrated with the ink.

Table 1 shows the results.

Example 2

In the present example, first, in completely the same manner as in Example 1, each of the glass fiber yarns 2, 3 having 4000 glass filaments bundled, each with a diameter of 23.3 μm, and having a mass of 4440 tex was wound around a roll to form a roving.

Next, in the same manner as in Example 1, the connection 5 having a width $W_1$ of 30 mm was formed. Subsequently, the resin yarn 4 made of polypropylene was wound around the connection 5 by using the splicer (manufactured by Mesdan S.p.A) or the like so that the wound part had a width $W_2$ being 75% of the width $W_1$ of the connection 5 and the connection diameter R was 3000 μm, to form the glass-fiber-yarn joined body 1 in which the glass fiber yarns 2, 3 were joined by the connection 5.

As a result, in the glass-fiber-yarn joined body 1 of the present example, the value of the ratio of mass of the glass fiber yarn 2 or the glass fiber yarn 3 relative to the connection diameter R (mass of glass fiber yarn/connection diameter R) is 1.48 (=4440/3000).

Next, while tension was applied to the glass-fiber-yarn joined body 1 of the present example so that a traveling speed was 10 m/min, a thermosetting resin as a matrix resin was impregnated into the glass-fiber-yarn joined body 1, which was allowed to pass through the dice for removal of excess resin, the obtained glass-fiber-yarn joined body 1 was then wound around a plate, and the resin was cured by hot pressing at 80° C., to manufacture a molded body of the long-fiber-reinforced plastic. For the manufacturing, 48 glass fiber rovings having 47 connections 5 were used, and evaluations were made as to whether or not the disjoining has occurred and the dice traveling ability in completely the same manner as in Example 1, and the opening degree of the connection was evaluated as follows.

Concerning the opening degree of the connection 5, for a molded product including 47 connections 5, the evaluation was made as ⊚ when no whitening had occurred due to non-impregnation in a portion including the connection 5 after molding, the evaluation was made as ◯ when the whitening had occurred in one or two places, and the evaluation was made as X when the whitening had occurred in three or more places.

Table 1 shows the results.

Example 3

In the present example, first, in completely the same manner as in Example 1, each of the glass fiber yarns 2, 3 having 2000 glass filaments bundled, each with a diameter of 23.3 μm, and having a mass of 2220 tex was wound around a roll to form a roving.

Next, in the same manner as in Example 2, the glass-fiber-yarn joined body 1 was formed in which the connection 5 had a width $W_1$ of 30 mm, the wound part had a width $W_2$ being 75% of the width $W_1$ of the connection 5, and the connection diameter R was 2000 μm.

As a result, in the glass-fiber-yarn joined body 1 of the present example, the value of the ratio of mass of the glass fiber yarn 2 or the glass fiber yarn 3 relative to the connection diameter R (mass of glass fiber yarn/connection diameter R) is 1.11 (=2220/2000).

Next, for the glass-fiber-yarn joined body 1 of the present example, evaluations were made as to whether or not the disjoining has occurred, the dice traveling ability, and the opening degree of the connection 5, in completely the same manner as in Example 2. Table 1 shows the results.

Example 4

In the present example, first, in completely the same manner as in Example 1, each of the glass fiber yarns 2, 3 having 2000 glass filaments bundled, each with a diameter of 16.7 μm, and having a mass of 1150 tex was wound around a roll to form a roving.

Next, in the same manner as in Example 2, the glass-fiber-yarn joined body 1 was formed in which the connection 5 had a width $W_1$ of 30 mm, the wound part had a width $W_2$ being 75% of the width $W_1$ of the connection 5, and the connection diameter R was 1500 μm.

As a result, in the glass-fiber-yarn joined body 1 of the present example, the value of the ratio of mass of the glass fiber yarn 2 or the glass fiber yarn 3 relative to the connection diameter R (mass of glass fiber yarn/connection diameter R) is 0.77 (=1150/1500)

Next, for the glass-fiber-yarn joined body 1 of the present example, evaluations were made as to whether or not the disjoining has occurred, the dice traveling ability, and the opening degree of the connection 5, in completely the same manner as in Example 2. Table 1 shows the results.

Example 5

In the present example, first, in completely the same manner as in Example 1, each of the glass fiber yarns 2, 3 having 2000 glass filaments bundled, each with a diameter of 16.7 μm, and having a mass of 1150 tex was wound around a roll to form a roving.

Next, in the same manner as in Example 1, the glass-fiber-yarn joined body 1 was formed in which the connection 5 had a width $W_1$ of 30 mm, the wound part had a width $W_2$ being 75% of the width $W_1$ of the connection 5, and the connection diameter R was 700 μm.

As a result, in the glass-fiber-yarn joined body 1 of the present example, the value of the ratio of mass of the glass fiber yarn 2 or the glass fiber yarn 3 relative to the connection diameter R (mass of glass fiber yarn/connection diameter R) is 1.64 (=1150/700).

Next, for the glass-fiber-yarn joined body 1 of the present example, evaluations were made as to whether or not the disjoining has occurred, the dice traveling ability, and the opening degree of the connection 5, in completely the same manner as in Example 1. Table 1 shows the results.

Example 6

In the present example, first, in completely the same manner as in Example 1, each of the glass fiber yarns 2, 3 having 2000 glass filaments bundled, each with a diameter of 16.7 μm, and having a mass of 1150 tex was wound around a roll to form a roving.

Next, in the same manner as in Example 1, the glass-fiber-yarn joined body 1 was formed in which the connection 5 had a width $W_1$ of 30 mm, the wound part had a width $W_2$ being 75% of the width $W_1$ of the connection 5, and the connection diameter R was 2000 μm.

As a result, in the glass-fiber-yarn joined body 1 of the present example, the value of the ratio of mass of the glass fiber yarn 2 or the glass fiber yarn 3 relative to the connection diameter R (mass of glass fiber yarn/connection diameter R) is 0.58 (=1150/2000).

Next, for the glass-fiber-yarn joined body 1 of the present example, evaluations were made as to whether or not the disjoining has occurred, the dice traveling ability, and the opening degree of the connection 5, in completely the same manner as in Example 1. Table 1 shows the results.

Comparative Example 1

In the present comparative example, first, in the same manner as in Example 1, each of the glass fiber yarns 2, 3 having 4000 glass filaments bundled, each with a diameter of 17.1 μm, and having a mass of 2400 tex was wound around a roll to form a roving.

Next, in completely the same manner as in Example 1, the glass-fiber-yarn joined body 1 was formed in which the connection 5 had a width $W_1$ of 15 mm, the wound part had a width $W_2$ being 75% of the width $W_1$ of the connection 5, and the connection diameter R was 2000 μm.

As a result, in the glass-fiber-yarn joined body 1 of the present comparative example, the value of the ratio of mass of the glass fiber yarn 2 or the glass fiber yarn 3 relative to the connection diameter R (mass of glass fiber yarn/connection diameter R) is 1.20 (=2400/2000).

Next, for the glass-fiber-yarn joined body 1 of the present comparative example, evaluations were made as to whether or not the disjoining has occurred, the dice traveling ability, and the opening degree of the connection 5, in completely the same manner as in Example 1. Table 2 shows the results.

Comparative Example 2

In the present comparative example, first, in completely the same manner as in Example 1, each of the glass fiber yarns 2, 3 having 4000 glass filaments bundled, each with a diameter of 17.1 μm, and having a mass of 2400 tex was wound around a roll to form a roving.

Next, in completely the same manner as in Example 1, the glass-fiber-yarn joined body 1 was formed in which the connection 5 had a width $W_1$ of 45 mm, the wound part had a width $W_2$ being 75% of the width $W_1$ of the connection 5, and the connection diameter R was 2000 μm.

As a result, in the glass-fiber-yarn joined body 1 of the present comparative example, the value of the ratio of mass of the glass fiber yarn 2 or the glass fiber yarn 3 relative to the connection diameter R (mass of glass fiber yarn/connection diameter R) is 1.20 (=2400/2000).

Next, for the glass-fiber-yarn joined body 1 of the present comparative example, evaluations were made as to whether or not the disjoining has occurred, the dice traveling ability, and the opening degree of the connection 5, in completely the same manner as in Example 1. Table 2 shows the results.

Comparative Example 3

In the present comparative example, first, in completely the same manner as in Example 1, each of the glass fiber yarns 2, 3 having 2000 glass filaments bundled, each with a diameter of 23.3 μm, and having a mass of 2220 tex was wound around a roll to form a roving.

Next, in completely the same manner as in Example 1, the glass-fiber-yarn joined body 1 was formed in which the connection 5 had a width $W_1$ of 30 mm, the wound part had a width $W_2$ being 75% of the width $W_1$ of the connection 5, and the connection diameter R was 1000 μm.

As a result, in the glass-fiber-yarn joined body 1 of the present comparative example, the value of the ratio of mass of the glass fiber yarn 2 or the glass fiber yarn 3 relative to the connection diameter R (mass of glass fiber yarn/connection diameter R) is 2.20 (=2220/1000).

Next, for the glass-fiber-yarn joined body 1 of the present comparative example, evaluations were made as to whether or not the disjoining has occurred, the dice traveling ability, and the opening degree of the connection 5, in completely the same manner as in Example 1. Table 2 shows the results.

Comparative Example 4

In the present comparative example, first, in completely the same manner as in Example 1, each of the glass fiber yarns 2, 3 having 2000 glass filaments bundled, each with a diameter of 16.7 μm, and having a mass of 1150 tex was wound around a roll to form a roving.

Next, in completely the same manner as in Example 1, the glass-fiber-yarn joined body 1 was formed in which the connection 5 had a width $W_1$ of 30 mm, the wound part had a width $W_2$ being 75% of the width $W_1$ of the connection 5, and the connection diameter R was 4500 μm.

As a result, in the glass-fiber-yarn joined body 1 of the present comparative example, the value of the ratio of mass of the glass fiber yarn 2 or the glass fiber yarn 3 relative to the connection diameter R (mass of glass fiber yarn/connection diameter R) is 0.26 (=1150/4500).

Next, for the glass-fiber-yarn joined body 1 of the present comparative example, evaluations were made as to whether or not the disjoining has occurred, the dice traveling ability, and the opening degree of the connection 5, in completely the same manner as in Example 1. Table 2 shows the results.

Comparative Example 5

In the present comparative example, first, in completely the same manner as in Example 1, each of the glass fiber yarns 2, 3 having 4000 glass filaments bundled, each with a diameter of 17.1 μm, and having a mass of 2400 tex was wound around a roll to form a roving.

Next, the terminal end of the glass fiber yarn 2 and the starting end of the glass fiber yarn 3 were taken out of the rovings and joined by a creel to form a glass-fiber-yarn joined body.

Next, for the glass-fiber-yarn joined body of the present comparative example in which the glass fiber yarns 2, 3 were joined by the creel, evaluations were made as to whether or not the disjoining has occurred, the dice traveling ability, and the opening degree of the connection 5, in completely the same manner as in Example 1. Table 2 shows the result.

Comparative Example 6

In the present comparative example, first, in completely the same manner as in Example 1, each of the glass fiber yarns 2, 3 having 4000 glass filaments bundled, each with a diameter of 17.1 μm, and having a mass of 2400 tex was wound around a roll to form a roving.

Next, the terminal end of the glass fiber yarn 2 and the starting end of the glass fiber yarn 3 were taken out of the rovings and joined by air-splicing to form a glass-fiber-yarn joined body.

Next, for the glass-fiber-yarn joined body of the present comparative example in which the glass fiber yarns 2, 3 were joined by air-splicing, evaluations were made as to whether or not the disjoining has occurred, the dice traveling ability, and the opening degree of the connection 5, in completely the same manner as in Example 1. Table 2 shows the results.

TABLE 1

| | Example | | | | | |
|---|---|---|---|---|---|---|
| | 1 | 2 | 3 | 4 | 5 | 6 |
| Glass filament diameter (μm) | 17.1 | 23.3 | 23.3 | 16.7 | 16.7 | 16.7 |
| Number of glass filaments bundled (filaments) | 4000 | 4000 | 2000 | 2000 | 2000 | 2000 |

TABLE 1-continued

|  | Example 1 | Example 2 | Example 3 | Example 4 | Example 5 | Example 6 |
|---|---|---|---|---|---|---|
| Mass of glass fiber yarn (tex) | 2400 | 4440 | 2220 | 1150 | 1150 | 1150 |
| Type of matrix resin | thermoplastic | thermosetting | thermosetting | thermosetting | thermoplastic | thermoplastic |
| Type of resin yarn | PA | PP | PP | PP | PA | PA |
| Connection width $W_1$ (mm) | 30 | 30 | 30 | 30 | 30 | 30 |
| Connection diameter (μm) | 2000 | 3000 | 2000 | 1500 | 700 | 2000 |
| (Mass of glass fiber yarn/ Connection diameter R) | 1.20 | 1.48 | 1.11 | 0.77 | 1.64 | 0.58 |
| Disjoining | ○ | ○ | ○ | ○ | ○ | ○ |
| Dice traveling ability | ○ | ○ | ○ | ○ | ○ | ○ |
| Opening degree of connection | ◎ | ◎ | ◎ | ◎ | ○ | ○ |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Glass filament diameter (μm) | 17.1 | 17.1 | 23.3 | 16.7 | 17.1 | 17.1 |
| Number of glass filaments bundled (filaments) | 4000 | 4000 | 2000 | 2000 | 4000 | 4000 |
| Mass of glass fiber yarn (tex) | 2400 | 2400 | 2220 | 1150 | 2400 | 2400 |
| Type of matrix resin | thermoplastic | thermoplastic | thermoplastic | thermoplastic | thermoplastic | thermoplastic |
| Type of resin yarn | PA | PA | PA | PA | — | — |
| Connection width $W_1$ (mm) | 15 | 45 | 30 | 30 | — | — |
| Connection diameter (μm) | 2000 | 2000 | 1000 | 4500 | — | — |
| (Mass of glass fiber yarn/ Connection diameter R) | 1.20 | 1.20 | 2.22 | 0.26 | — | — |
| Disjoining | X | ○ | ○ | ○ | ○ | X |
| Dice traveling ability | ○ | X | ○ | X | X | ○ |
| Opening degree of connection | ◎ | ◎ | X | X | X | ◎ |

It is apparent from Table 1 that, according to the glass-fiber-yarn joined bodies 1 of Examples 1 to 6 of the present invention, no disjoining occurs upon application of tension, the dice traveling ability is favorable, the passage through the dice is possible without trouble after the impregnation of the resin, the connection 5 has a favorable opening degree, and excellent appearance quality can be obtained in a molded product. Particularly in each of the glass fiber joined bodies 1 of Examples 1 to 4 where the value of the ratio of mass of the glass fiber yarn 2 or the glass fiber yarn 3 relative to the connection diameter R (mass of glass fiber yarn/connection diameter) is in the range of 0.64 to 1.55, the opening degree of the connection 5 is particularly favorable and the resin impregnability in the connection 5 is particularly high, so that it is possible to obtain a glass-fiber-reinforced resin molded product particularly excellent in appearance quality.

On the other hand, from Table 2, according to the glass-fiber-yarn joined body 1 of Comparative Example 1 where the width $W_1$ of the connection 5 is 15 mm which is smaller than 20 mm, the disjoining occurs upon application of tension, and according to the glass-fiber-yarn joined body 1 of Comparative Example 2 where the width $W_1$ of the connection 5 is 45 mm which is larger than 40 mm, trouble occurs at the time of the passage through the dice after the impregnation of the resin.

Further, according to the glass-fiber-yarn joined body 1 of Comparative Example 3 where the value of the ratio of mass of the glass fiber yarn 2 or the glass fiber yarn 3 relative to the connection diameter R (mass of glass fiber yarn/connection diameter R) is 2.22 which is more than 2.00, the opening degree of the connection 5 is low, and according to the glass-fiber-yarn joined body 1 of Comparative Example 4 where the value of the ratio is 0.26 which is less than 0.32, trouble occurs at the time of the passage through the dice after the impregnation of the resin, and the opening degree of the connection 5 is low, in addition to that trouble occurs at the time of the passage through the dice after the impregnation of the resin.

Moreover, with the glass-fiber-yarn joined body of Comparative Example 5 where the glass fiber yarns 2, 3 are joined by the creel, the opening degree of the connection 5 is low in addition to that trouble occurs at the time of the passage through the dice after the impregnation of the resin, and with the glass fiber joined body of Comparative Example 6 where the glass fiber yarns 2, 3 are joined by air-splicing, the disjoining occurs upon application of tension.

The invention claimed is:

1. A glass-fiber-yarn joined body, comprising:
   a first glass fiber yarn;
   a second glass fiber yarn; and
   a connection in which a resin yarn is wound around ends of both of the glass fiber yarns, the ends being superimposed with each other,
   wherein
   the connection has a width in a range from 20 to 40 mm, and
   a connection diameter as a total of diameters of the respective glass fiber yarns and a thickness of the resin yarn wound around the connection is in a range of 500 to 5000 μm and a mass of each of the glass fiber yarns is in a range of 200 to 6000 tex, and a value of a ratio of mass of the glass fiber yarn relative to the connection diameter (mass of glass fiber yarn/connection diameter) is in a range of 0.32 to 2.00.

2. The glass-fiber-yarn joined body according to claim 1, wherein a width of a wound part where the resin yarn is wound is in a range of 60 to 110% of a width of the connection.

3. The glass-fiber-yarn joined body according to claim 1, wherein the value of the ratio of mass of the glass fiber yarn relative to the connection diameter in the glass-fiber-yarn joined body of claim 1 is in a range of 0.64 to 1.55.

4. A glass-fiber-reinforced resin molded product, comprising:
   a glass-fiber-yarn joined body that includes
   a first glass fiber yarn,
   a second glass fiber yarn, and
   a connection in which a resin yarn is wound around ends of both of the glass fiber yarns, the ends being superimposed with each other, and in which
   the connection has a width in a range from 20 to 40 mm, and
   a connection diameter as a total of diameters of the respective glass fiber yarns and a thickness of the resin yarn wound around the connection is in a range of 500 to 5000 μm and a mass of each of the glass fiber yarns is in a range of 200 to 6000 tex, and a value of a ratio of mass of the glass fiber yarn relative to the connection diameter (mass of glass fiber yarn/connection diameter) is in a range of 0.32 to 2.00.

5. The glass-fiber-reinforced resin molded product according to claim 4, wherein a width of a wound part where the resin yarn is wound is in a range of 60 to 110% of a width of the connection.

6. The glass-fiber-reinforced resin molded product according to claim 4, wherein the value of the ratio of mass of the glass fiber yarn relative to the connection diameter is in a range of 0.64 to 1.55.

* * * * *